United States Patent
Gupta et al.

(10) Patent No.: US 9,947,334 B2
(45) Date of Patent: Apr. 17, 2018

(54) ENHANCED CONVERSATIONAL COMMUNICATIONS IN SHARED ACOUSTIC SPACE

(71) Applicant: QUALCOMM Incorporated, San Diego, CA (US)

(72) Inventors: Samir Kumar Gupta, San Diego, CA (US); Asif Iqbal Mohammad, San Diego, CA (US); Erik Visser, San Diego, CA (US); Lae-Hoon Kim, San Diego, CA (US); Shaun William Van Dyken, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/808,870

(22) Filed: Jul. 24, 2015

(65) Prior Publication Data
US 2016/0171989 A1   Jun. 16, 2016

Related U.S. Application Data

(60) Provisional application No. 62/091,367, filed on Dec. 12, 2014.

(51) Int. Cl.
*G10L 21/0208* (2013.01)
*G10K 11/175* (2006.01)
(Continued)

(52) U.S. Cl.
CPC ........ *G10L 21/0208* (2013.01); *G10K 11/175* (2013.01); *H04M 9/082* (2013.01);
(Continued)

(58) Field of Classification Search
CPC ............... H04R 2499/13; G10L 21/02; G10L 2021/02082; G10L 21/0208; G10K 11/175; G10K 11/178; H04M 9/082
See application file for complete search history.

(56) References Cited

U.S. PATENT DOCUMENTS 5,022,082 A * 6/1991 Eriksson ............ G10K 11/1784
381/71.8
6,980,663 B1   12/2005 Linhard
(Continued)

FOREIGN PATENT DOCUMENTS

EP   1591995 A1   11/2005
JP   2008035472 A   2/2008
(Continued)

OTHER PUBLICATIONS

International Search Report and Written Opinion for International Application No. PCT/US2015/058133, ISA/EPO, dated Jan. 20, 2016, 10 pages.

*Primary Examiner* — Mark Fischer
(74) *Attorney, Agent, or Firm* — Toler Law Group, P.C.

(57) ABSTRACT

A multichannel acoustic system (MAS) comprises an arrangement of microphones and loudspeakers and a multichannel acoustic processor (MAP) to together enhance conversational speech between two or more persons in a shared acoustic space such as an automobile. The enhancements are achieved by receiving sound signals substantially originating from relatively near sound sources; filtering the sound signals to cancel at least one echo signal detected for at least one microphone from among the plurality of microphones; filtering the sound signals received by the plurality of microphones to cancel at least one feedback signal detected for at least one microphone from among the plurality of microphones; and reproducing the filtered sound signals for each microphone from among the plurality of microphones on a subset of loudspeakers corresponding that are relatively far from the source microphone.

28 Claims, 11 Drawing Sheets

(51) Int. Cl.
*H04M 9/08* (2006.01)
*H04R 27/00* (2006.01)
*G10L 21/0216* (2013.01)

(52) U.S. Cl.
CPC .... *H04R 27/00* (2013.01); *G10L 2021/02082* (2013.01); *G10L 2021/02166* (2013.01); *H04R 2499/13* (2013.01)

(56) References Cited

U.S. PATENT DOCUMENTS

| | | | |
|---|---|---|---|
| 2002/0071573 A1* | 6/2002 | Finn | G10L 21/0208 381/93 |
| 2005/0013451 A1* | 1/2005 | Finn | H04R 3/02 381/110 |
| 2005/0117753 A1 | 6/2005 | Miura et al. | |
| 2010/0189275 A1 | 7/2010 | Christoph | |
| 2014/0119566 A1* | 5/2014 | Hiramoto | H04R 1/025 381/86 |

FOREIGN PATENT DOCUMENTS

| | | |
|---|---|---|
| JP | 2008042390 A | 2/2008 |
| WO | 2008061205 A2 | 5/2008 |

\* cited by examiner

ENHANCED CONVERSATIONAL COMMUNICATIONS IN SHARED ACOUSTIC SPACE

CROSS-REFERENCE TO RELATED APPLICATIONS

This patent application claims the benefit of Provisional Application No. 62/091,367, filed Dec. 12, 2014, entitled "ENHANCED CONVERSATIONAL COMMUNICATIONS IN SHARED ACOUSTIC SPACE", which is incorporated by reference herein in its entirety and to which priority is claimed.

BACKGROUND

A conversation between two persons can be difficult in a shared acoustic space where other people are also speaking, where there are other sources of noise (speech and non-speech), and/or where physical limitations of the environment otherwise make speech difficult. For example, in the context of a moving automobile, it may be difficult for a person in a front passenger seat to easily and clearly converse with a person in a third-row passenger seat because of speech occurring between other people in the vehicle (which may be in closer proximity to or between the front seat passenger and the third-row seat passenger). Furthermore, other sources of noise common to a moving vehicle (e.g., engine noise, road noise, traffic noise, music, etc.) can also make a conversation difficult, as can the physical limitations of the environment such as the distance between the parties and the orientation of the front seat passenger away from the third-row seat passenger (without regard to the uncomfortable and unsafe turning of the body and head of the front seat passenger towards the back of the vehicle).

SUMMARY

Various implementations disclosed herein are directed to a multichannel acoustic system (MAS) comprising an arrangement of microphones and loudspeakers along with a multichannel acoustic processor (MAP) to together enhance conversational speech between two or more persons in a shared acoustic space. Several such implementations are specifically directed to the integration of a MAS into an automobile. Other implementations are directed to the integration of MAS into other forms of transportation (e.g., planes, trains, motorcycles, boats, etc.). Yet other implementations are directed to non-transportation shared acoustic spaces such as theaters, conference rooms, presentation halls, and any other location where a public address system might be utilized.

Various such implementations are directed to enhancing conversational speech in a shared acoustic space of a vehicle having a multichannel acoustic system operating within the shared acoustic space, the multichannel acoustic system comprising a plurality of microphones and a plurality of loudspeakers, the vehicle having a plurality of zones comprising at least a first zone and a second zone, the method comprising: receiving, at the plurality of microphones distributed throughout the shared acoustic space, sound signals substantially originating from a first zone sound source; echo filtering, at a plurality of adaptable sound filters, the sound signals to cancel at least one echo signal; feedback filtering, at the plurality of adaptable sound filters, the sound signals to cancel at least one feedback signal, the feedback filtering occurring before or after the echo filtering; and reproducing filtered sound signals on a subset of loudspeakers in the second zone. For several such implementations the multichannel acoustic system enables a first passenger seated in a front row of the vehicle corresponding to a first zone to converse with a second passenger seated in a second zone corresponding to a row other than the first row, and/or canceling the at least one echo signal is performed based on a predetermined echo cancelation calibration. For select implementations, the predetermined echo cancelation calibration is one from among a plurality of predetermined echo cancelation calibrations wherein each of the predetermined echo cancelation calibration is performed based on different passenger configurations.

For certain implementations, each filter from among the plurality of adaptable sound filters is configured to: receive, at each filter, sound signals intended for reproduction on at least one loudspeaker in the second zone and detected by at least one microphone in the first zone; receive, at each filter, evaluation signals from at least one microphone in the second zone, the evaluation signals corresponding to the received sound signals; determine, at the filter and based on the received evaluation signals, that the sound signals include a feedback signal; cancel the feedback signal; and send the filtered sound signals to at least one loudspeaker in the second zone. For a subset of such implementations, each filter from among the plurality of adaptable sound filters is coupled to at least one microphone in the first zone, at least one loudspeaker in the second zone, and at least one secondary microphone in the second zone, wherein each combination of microphone, loudspeaker, and secondary microphone is different for each filter from among the plurality of adaptable sound filters.

For several implementations, the plurality of microphones comprises a plurality of directional microphones, and the sound signals reproduced by each loudspeaker from among the plurality of loudspeakers are limited to a listener in a same zone as each such loudspeaker.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
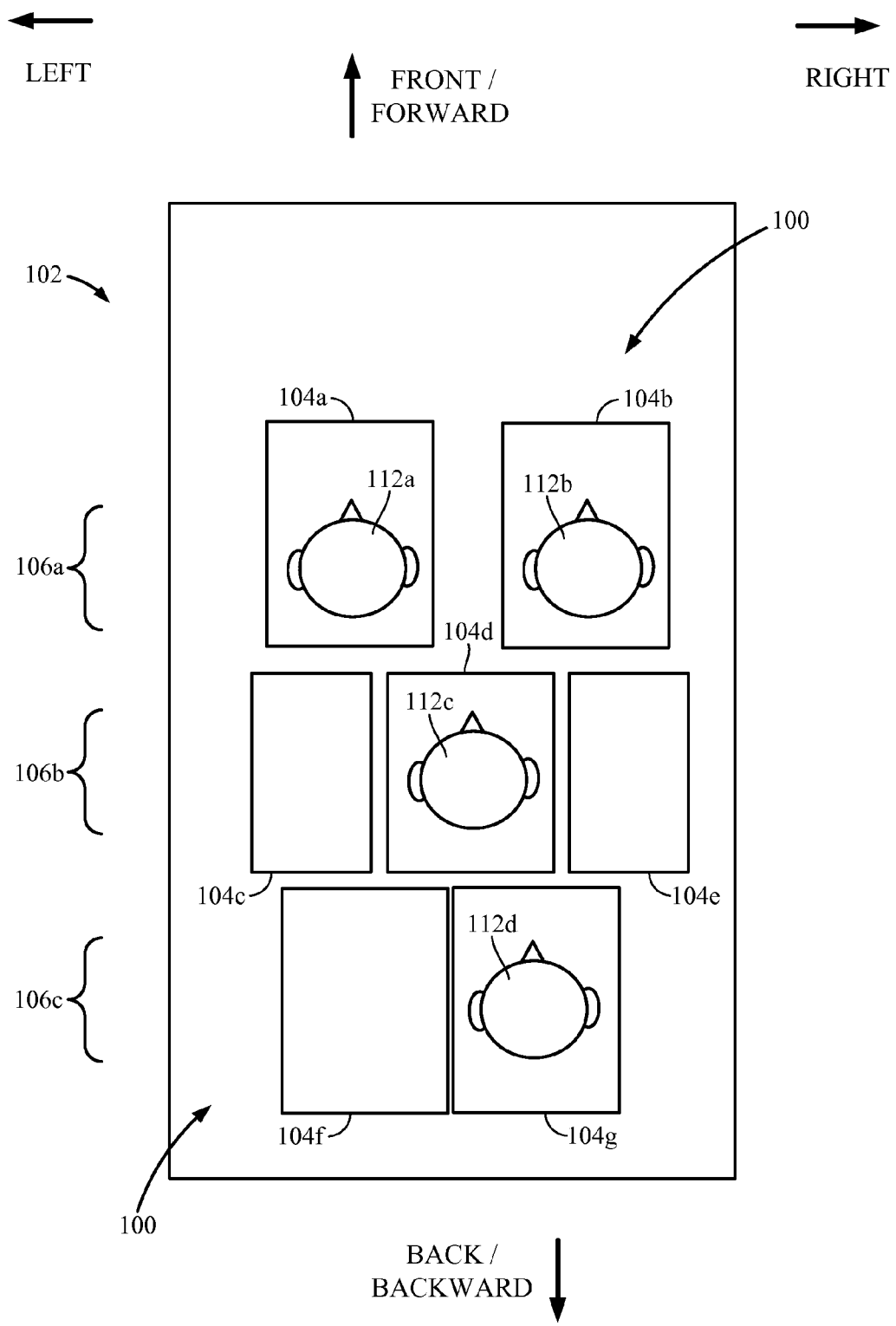
FIG. 1 is a block diagram illustrating an exemplary shared acoustic space 100—specifically, an automobile having seven seats arranged in three rows—in which various implementations disclosed herein may be implemented.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." References to a "location" of a microphone indicate the location of the center of an acoustically sensitive face of that microphone unless otherwise indicated by the context. The term "channel" is used at times to indicate a signal path and at other times to indicate a signal carried by such a path, according to the particular context.

Furthermore, unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one, whereas the term "subset" is used herein to indicate an integer quantity that is greater than or equal to one.

Enhancing conversational speech in a shared acoustic space may be achieved by: receiving, at the plurality of microphones distributed throughout the shared acoustic space, sound signals substantially originating from relatively near sound sources; filtering, at a plurality of adaptable sound filters, the sound signals received by the plurality of microphones to cancel at least one echo signal detected for at least one microphone from among the plurality of microphones; filtering, at a plurality of adaptable sound filters, the sound signals received by the plurality of microphones to cancel at least one feedback signal detected for at least one microphone from among the plurality of microphones; and reproducing, on a subset of loudspeakers from among the plurality of loudspeakers distributed throughout the shared acoustic space, the filtered sound signals for each microphone from among the plurality of microphones, wherein for each microphone the subset of loudspeakers corresponds to one or more relatively far loudspeakers.

Enhancing conversational speech is useful for the interior passenger compartment of a "transportation vehicle for persons" (e.g., an automobile) or a non-transportation shared acoustic space. For such automobile and related implementations, the plurality of microphones and the plurality of loudspeakers may be distributed throughout the shared acoustic space in relation to the passenger seats of the vehicle, and such implementation may thereby enable a first passenger seated in a front row of the automobile to converse with a second passenger seated in a row other than the first row of the automobile.

Canceling echo signals may also be performed based on a predetermined echo cancelation calibration, and this predetermined echo cancelation calibration may be one from among a plurality of predetermined echo cancelation calibrations that are predetermined (or performed) based on different passenger configurations.

Adaptable sound filters may be used for feedback cancelation wherein each filter is configured to: receive sound signals detected by a microphone from among the plurality of microphones, the sound signals being intended for a relatively far loudspeaker from among a plurality of loudspeakers; receive evaluation signals from a second microphone that is relatively near the far speaker, the evaluation signals corresponding to the sound signals; determine, based on the received evaluation signals, that the sound signals include a feedback signal; and cancel the feedback signal; and send the filtered sound signals to the relatively far loudspeaker. Moreover, for select implementations, each filter from among the plurality of adaptable sound filters may be coupled to a microphone from among the plurality of microphones, a loudspeaker from among a plurality of loudspeakers that is relatively far from the microphone, and a second microphone from among the plurality of microphones that is relatively near the loudspeaker and relatively far from the microphone, wherein each combination of microphone, loudspeaker, and second microphone is different for each filter from among the plurality of filters (i.e., each corresponds to a different configuration of passengers).

Directional microphones might be utilized for the plurality of microphones, and some implementations may be configured such that sound signals reproduced by each loudspeaker from among the plurality of loudspeakers are limited to listeners relatively near to each such speaker.

FIG. 1 is an illustration of an exemplary shared acoustic space 100, specifically, the interior passenger compartment of an automobile 102 having seven seats 104a-104g arranged in three rows 106a-106c. As illustrated in FIG. 1, the total number of passengers at any given time (or trip) may range from one to seven configured (i.e., sitting) in a limited number of relatively fixed locations. Thus, the number of physical seating configurations (i.e., occupied seats versus unoccupied seats) is finite and limited, and this shared acoustic space 100 is well-defined.

For example, in one configuration as illustrated in FIG. 1, four passengers 112a-112d may occupy seats 104a (which, in the configuration shown for the automobile 102, is the driver's seat), 104b (for a front-seat passenger), 104d (for a middle-row center-seat passenger), and 104g (for a third-row seat passenger on the vehicle-right side). Moreover, because this shared acoustic space 100 is an automobile 102, it follows that passengers 112a-112d are generally facing forward (i.e., toward the front of the vehicle). For this reason, passenger 112d may have a difficult time clearly and easily hearing passenger 112b. As such, it may be difficult for passengers 112b and 112d to converse with each other, and this situation may be worsened by noise from the other passengers, the vehicles in engine and movement, centrally-provided music, etc.

Figure 2:
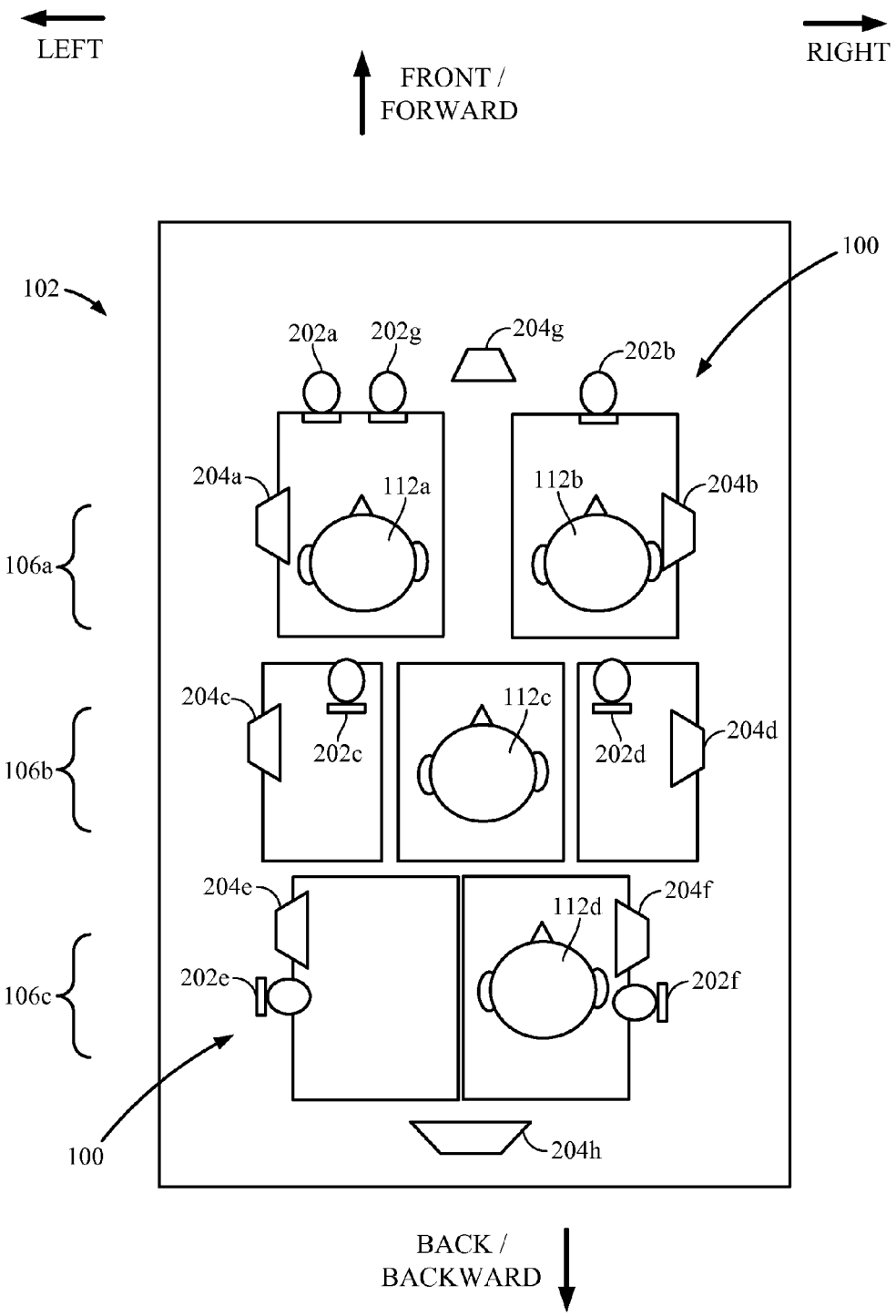
FIG. 2 is a block diagram illustrating the shared acoustic space of the automobile of FIG. 1 incorporating a multichannel acoustic system (MAS) representative of various implementations disclosed herein.

FIG. 2 illustrates the shared acoustic space 100 of the automobile 102 of FIG. 1 incorporating a multichannel acoustic system (MAS) representative of various implementations disclosed herein. As illustrated, the shared acoustic space 100 of the automobile 102 further comprises a plurality of microphones 202a-202g and loudspeakers 204a-204h which are the visible or exposed components of the MAS that are communicatively coupled to the multichannel acoustic processor (MAP) integrated throughout the vehicle (and thus not shown) that processes sound inputs and produces enhanced outputs for an improved acoustic experience. For the various implementations herein disclosed, the MAP acts to balance sounds across the vehicle by taking sounds generated from any part of the vehicle, received as inputs at one or more of the microphones 202a-202g, and reproducing these sounds on a set or subset of loudspeakers 204a-204h in the other parts of the vehicle.

The loudspeakers may be arranged in any of several different configuration such as the 7.1 surround sound system arrangement illustrated in FIG. 2. Moreover, the plurality of microphones 202a-202g and the plurality of loudspeakers 204a-204h might be communicatively coupled to a centralized MAP located in a single location anywhere in the vehicle. Moreover, in alternative implementations, the MAP might instead be remotely located and connected by wireless means. Regardless, the MAP is operatively coupled to various inputs and produces enhanced outputs for an improved acoustic experience (such as enhanced clarity in speech that is heard, less irritation from superfluous background noises, etc.).

For certain implementations, the pairs of loudspeakers in each row (e.g., loudspeakers 204a and 204b in the first row 106a) may provide stereo output for a music player, and for certain other implementations the set of six loudspeakers 204a-204h operate together to provide the passengers with surround sound for music, movie soundtracks, or other surround sound media. Likewise, for certain implementations, and as shown in FIG. 2, more than one microphone may be provided for the driver, e.g., microphones 202a and 202g, and/or no microphone may be specifically provided for passenger 112c in seat 104d (a middle-row center-seat) which instead may utilize both microphones 202c and 202d where the MAS is able to use both of these microphones to service all three seated positions in the second row 106b (and likewise for the other rows if they were to have a third middle seat).

However, it should be noted that the use of multiple microphones in an acoustic space shared with multiple loudspeakers can lead to the undesired effects of echo and feedback.

In general, echo (also known as "Surround Sound Echo") results from any condition by which a specific sound emitting from different loudspeakers travels different paths and reaches a listener at different times, thereby creating a duplicative, repeating, or fuzzy sound effect. For a multi-loudspeaker system, each loudspeaker effectively contributes to echo effect because the sound produced by each loudspeaker will, to some extent, travel a unique acoustic path before reaching the ear of the listener. Moreover, although microphones are not required for an echo effect to occur, for the various implementations disclosed herein that employ multiple microphones, these various microphones may partially detect these sounds and reproduce them at one or more loudspeakers in a manner that further enhance the echo effect (distinct and separate from any feedback effects discussed later herein).

To compensate for the echo effect, and for certain implementations herein disclosed, one approach is for the MAS to actively learn the acoustic paths from each of the loudspeakers with respect to a specific target listening location found within the acoustic space. This active approach may comprise a calibration mode that produces one or more test sounds at each loudspeaker individually, measures these sounds using one or more microphones, and determines the learned acoustic path for each such loudspeaker with respect to the target listening location. The MAS can then create a mono-far-end reference signal by mixing the individual test sound signals using the learned acoustic paths. This mono-far-end reference signal can then be used to cancel the echo by appropriately modifying (delaying, quieting, etc.) the sound signals produced by each loudspeaker to effectively cancel the echo.

Additionally, because of the finite configurations of between one and seven persons in a seven seat environment, for example, it is possible that the echo effect differs based on each different configuration of people. Accordingly, for select implementations, the MAS may learn various echo cancelations schemes, one for each configuration, and then deploy a previously learned echo cancelation scheme when the particular configuration for which it was determined again occurs using active or passive configuration determination techniques discussed later herein.

Furthermore, for select implementations, echo effect calibrations may also be made for each configuration based on different target listening locations that could correspond to a specific favored target seat locations (e.g., the driver's seat) or a target location that favors a subset of specific seat locations (e.g., between the driver's seat and the front row passenger's seat) which are automatically selected based on various criteria (e.g., when the corresponding seat(s) are occupied) or, for specific implementations, might be directly selectable by a driver or a passenger accordingly. And for some implementations, a specific configuration may be selected based on the specific identities of one or more passengers (e.g., the vehicle owner or a "VIP passenger") based on their location within the vehicle, the identities being automatically determined by the system using active or passive identification determination techniques discussed later herein.

On the other hand, feedback (or "acoustic positive feedback") occurs when a sound loop exists between an audio input (e.g., a microphone) and an audio output (e.g., a loudspeaker). For example, a signal received by a microphone may be amplified and passed out of a loudspeaker. The sound from the loudspeaker can then be received by the microphone again, amplified further, and then passed out through the loudspeaker again. The frequency of the resulting sound is determined by resonance frequencies in the microphone, amplifier, and loudspeaker, the acoustics of the room, the directional pick-up and emission patterns of the microphone and loudspeaker, and the distance between them. For small public address (PA) systems, the sound is readily recognized as a loud squeal, screech, or howling sound.

One approach for reducing feedback is the selective input technique which utilizes low sensitivity directional microphones that can only pick up sounds within a limited range (e.g., a range less than the distance to any loudspeakers). This solution may be useful for shared acoustic spaces where the microphones utilized are those provided by, for example, personal communication devices which are designed to operate close to a person's mouth (or when speech originates in much closer proximity than sounds produced by a loudspeaker).

When the difference in distance between person-and-microphone versus loudspeaker-and-microphone is not significant—which is often the case for relatively confined shared acoustic spaces and/or microphones that are not used close to the mouth (such as those built into automobiles as shown in FIG. 2)—a more effective approach for reducing feedback is selective reproduction in which sounds are not reproduced by a loudspeaker when received at a nearby microphone (or nearby microphones). For example, for loudspeaker 204a of FIG. 2, sound that is received by near microphones 202a and/or 202g might not be reproduced on this loudspeaker 204a, thereby reducing possible feedback; however, sounds from the loudspeaker 204a may still be received at far microphone 202e which might still be reproduced on loudspeaker 204a causing feedback.

An alternative approach for reducing feedback on a loudspeaker (e.g., loudspeaker 204a) resulting from a far microphone (e.g., microphone 202e) that might still detect sounds (particularly loud sounds) produced by the subject loudspeaker 204a—and which can be used alone or in conjunction with the selective input approach described in the previous paragraph—is the crosstalk cancelation technique of this application. Crosstalk cancelation uses a microphone near the loudspeaker (e.g., microphone 202a) to collect a reference sound output for the loudspeaker (comprising loudspeaker 204a produced sound signals as well as any other sounds detectable by the near microphone 202a) that can then be used to proactively determine and filter out the same sound output of (and to the extent detected by) the far microphone 202e which might otherwise be directed to and reproduced on the loudspeaker 204a.

The reference sound output collected by the near microphone 202a for the loudspeaker 204a is the same output that is automatically precluded from being directly reproduced by the loudspeaker 204a in the selective reproduction technique described above.

Figure 3:
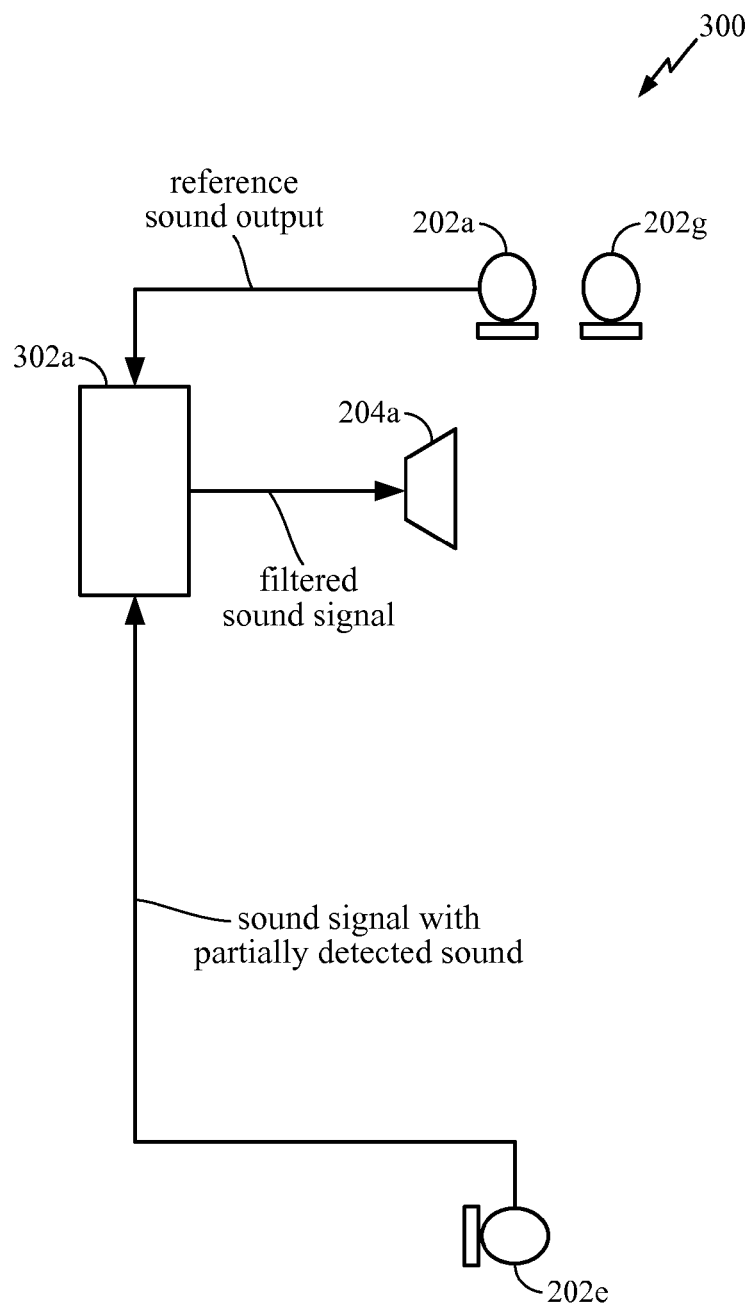
FIG. 3 is a block diagram illustrating system components that work together to perform the (half-duplex) crosstalk cancelation technique representative of and utilized by the various implementations disclosed herein.

FIG. 3 is a block diagram 300 illustrating system components that work together to perform the crosstalk cancelation technique representative of and utilized by the various implementations disclosed herein. In FIG. 3 (and in reference to FIGS. 1 and 2), a loudspeaker 204a produces a sound signal which is detected by near microphone 202a to produce a reference sound output that is sent to adaptive filter 302a. The sound signal is also detected, at least partially, by far microphone 202e and this partially detected sound would normally be sent (along with local sounds also detected by the microphone 202e) to the loudspeaker 204a and reproduced (leading to feedback). However, the adaptive filter 302a, using the reference sound output detected by near microphone 202a, filters out the partially detected sound so that only the local sounds detected by the far microphone 202e are reproduced on the loudspeaker 204a.

For certain implementations, the adaptive filter may be a fixed calibrated filter. For example, in implementations having only two fixed microphones and two fixed loudspeakers in the shared acoustic space, a fixed calibrated filter could be configured in advance during a calibration mode where each loudspeaker is playing and captured by each microphone to determine the cancelation to be subsequently performed by the system. Performing cross-talk cancelation using fixed calibrated filters is not limited to only an automotive context but, instead, may be utilized in any relatively fixed environment corresponding to the shared acoustic space. Accordingly, any use of an adaptive filter for the various implementations disclosed herein should be understood as also enabling the use of a fixed calibrated filter, and for use in shared acoustic spaces featuring fixed configurations of microphones and loudspeakers (although in no way limited to such).

The crosstalk cancelation illustrated in FIG. 3 is half-duplex (operating in only one direction) but can be extended to full-duplex for a two-way conversation between two persons near each microphone respectively. Moreover, for a shared acoustic space with multiple microphones and multiple loudspeakers, similar full-duplex crosstalk cancelation configurations can be formed for each combination of a loudspeaker, near microphone, and far microphone. In these various instances, the resultant "canceling" results in diminished or reduced crosstalk for higher sound quality from the listeners perspective.

Figure 4:
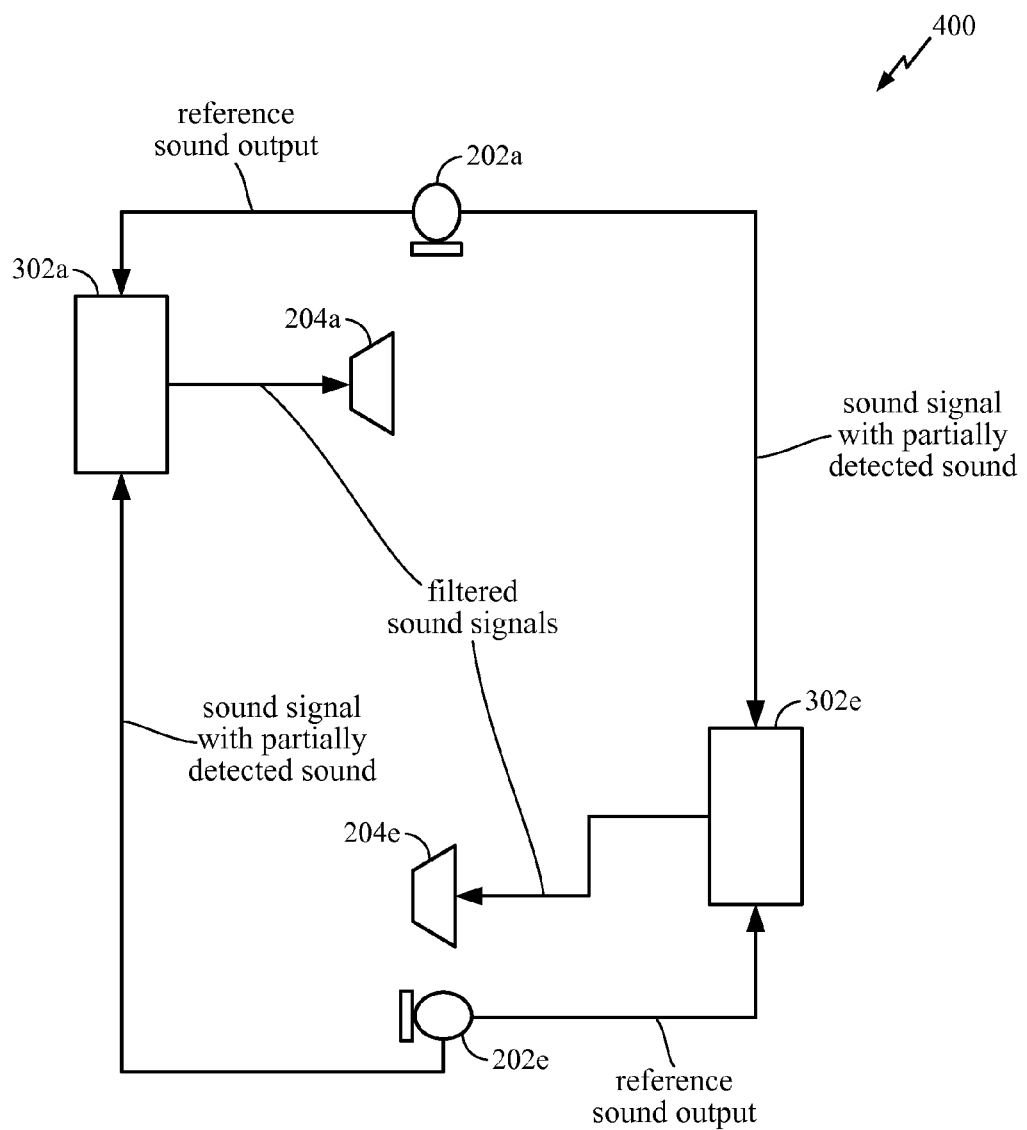
FIG. 4 is a block diagram illustrating system components that work together to perform a full-duplex crosstalk cancelation technique representative of and utilized by the various implementations disclosed herein.

FIG. 4 is a block diagram illustrating system components that work together to perform a full-duplex crosstalk cancelation technique representative of and utilized by the various implementations disclosed herein. As in FIG. 3, here in FIG. 4 a loudspeaker 204a produces a sound signal which is detected by near microphone 202a to produce a reference sound output that is sent to adaptive filter 302a. The sound signal is also detected, at least partially, by far microphone 202e and is sent to the adaptive filter 302a which, using the reference sound output detected by near microphone 202a, filters out the partially detected sound so that only the local sounds detected by the far microphone 202e are reproduced on the loudspeaker 204a. In addition, a loudspeaker 204e produces a separate sound signal which is detected by microphone 202e, which is the near microphone in this context, to produce a separate reference sound output that is sent to adaptive filter 302e. This separate sound signal is also detected, at least partially, by microphone 202a, the far microphone in this context, and sent to adaptive filter 302e which, using the reference sound output, then filters out the partially detected sound so that only the local sounds detected by the far microphone 202a are reproduced on the loudspeaker 204e.

Figure 5:
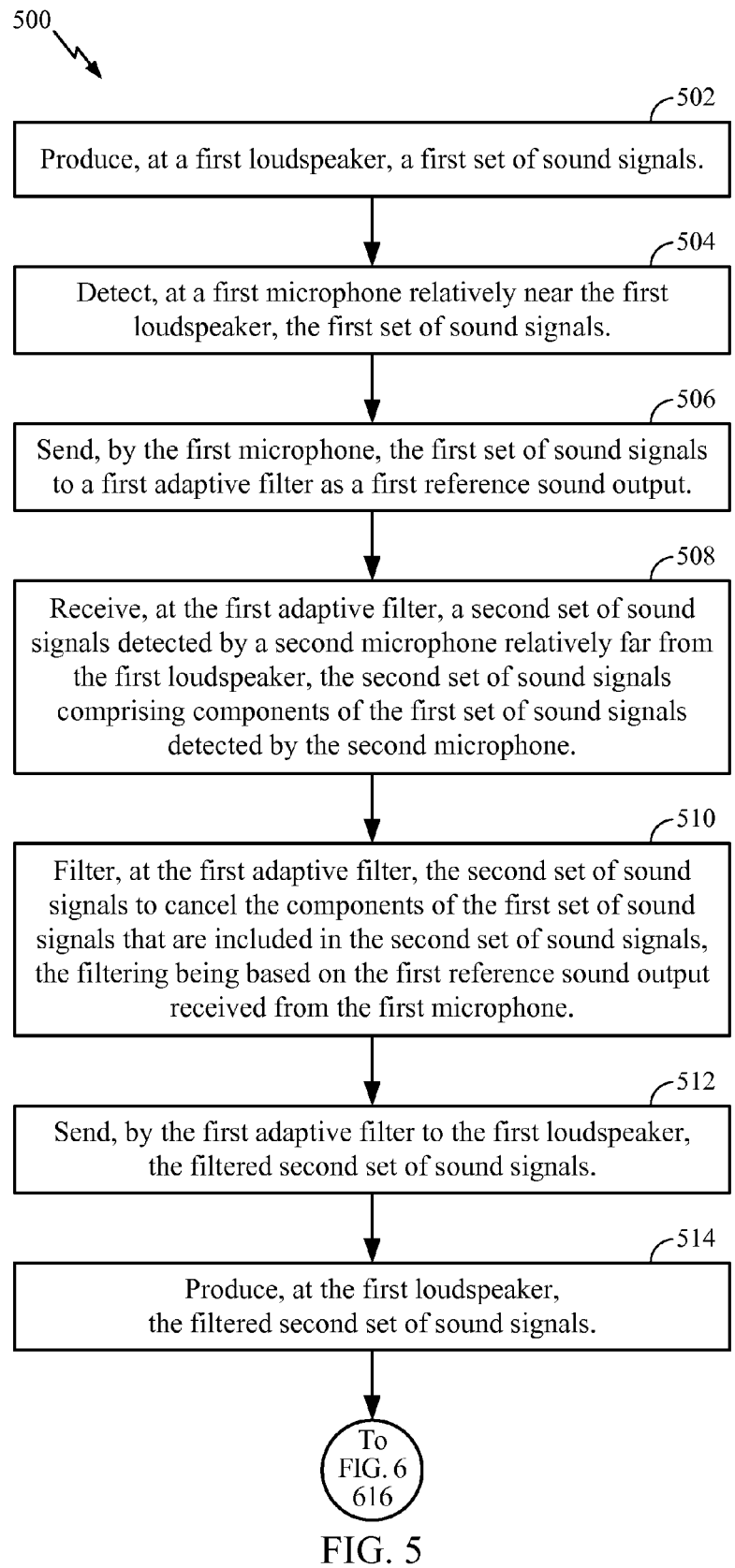
FIG. 5 is a process flow diagram for a method of performing crosstalk cancelation in a shared acoustic space for a MAS representative of various implementations disclosed herein.

FIG. 5 is a process flow diagram 500 for a method of performing crosstalk cancelation in a shared acoustic space for a MAS representative of various implementations disclosed herein. In FIG. 5, the MAS produces, at a first loudspeaker, a first set of sound signals at 502. At 504, the MAS detects, at a first microphone relatively near the first loudspeaker, the first set of sound signals. At 506, the MAS sends, by the first microphone, the first set of sound signals to a first adaptive filter as a first reference sound output. At 508, the MAS receives, at the first adaptive filter, a second set of sound signals detected by a second microphone relatively far from the first loudspeaker, the second set of sound signals comprising components of the first set of sound signals detected by the second microphone. At 510, the MAS filters, at the first adaptive filter, the second set of sound signals to cancel the components of the first set of sound signals that are included in the second set of sound signals, the filtering being based on the first reference sound output received from the first microphone. At 512, the MAS sends, by the first adaptive filter to the first loudspeaker, the filtered second set of sound signals. At 514, the MAS produces, at the first loudspeaker, the filtered second set of sound signals.

Figure 6:
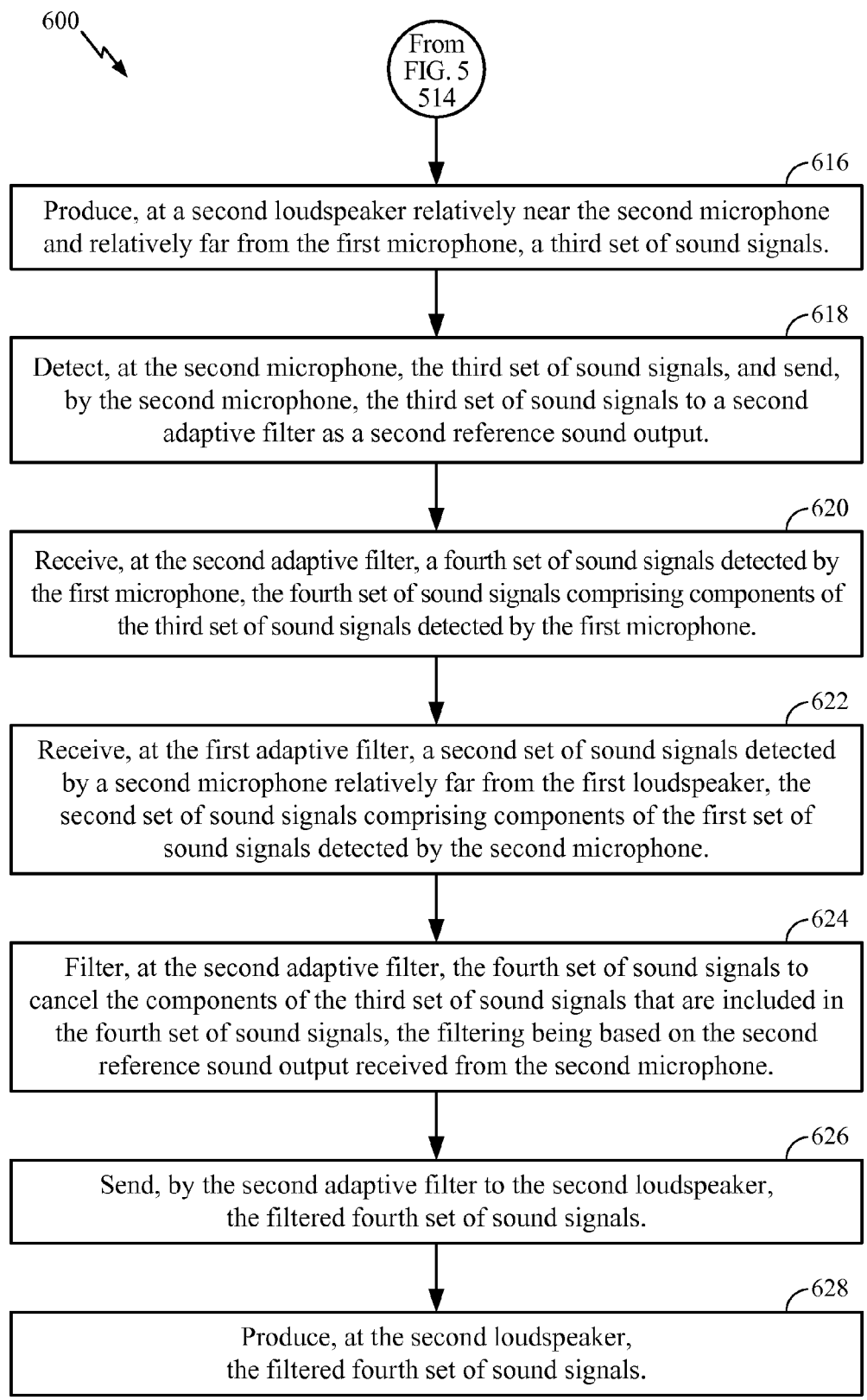
FIG. 6 is a process flow diagram for extending the half-duplex processing illustrated in FIG. 5 to full-duplex processing representative of various implementations disclosed herein.

FIG. 6 is a process flow diagram 600 for extending the half-duplex processing illustrated in FIG. 5 to full-duplex processing representative of various implementations disclosed herein. In FIG. 6, and continuing from the end of the process flow in FIG. 5, at 616, the MAS produces, at a second loudspeaker relatively near the second microphone and relatively far from the first microphone, a third set of sound signals. At 618, the MAS detects, at the second microphone, the third set of sound signals, and at 620, the MAS sends, by the second microphone, the third set of sound signals to a second adaptive filter as a second reference sound output. At 622, the MAS receives, at the second adaptive filter, a fourth set of sound signals detected by the first microphone, the fourth set of sound signals comprising components of the third set of sound signals detected by the first microphone. The MAS filters, at the second adaptive filter, the fourth set of sound signals to cancel the components of the third set of sound signals that are included in the fourth set of sound signals at 624, the filtering being based on the second reference sound output received from the second microphone. At 626, the MAS sends, by the second adaptive filter to the second loudspeaker, the filtered fourth set of sound signals. At 628, the MAS produces, at the second loudspeaker, the filtered fourth set of sound signals.

For several implementations, the adaptive filter may only operate to filter the reference sound output out of the corresponding received sound signals when the reference sound input is loud and the sound signals are soft (not loud). For example, for certain implementations, the adaptable filter may quantify the acoustic transfer function of the reference sound input, quantify the acoustic transfer function of the sound signals and, if the ratio of the former to the latter exceeds a predetermined threshold, only then filter the sound signal based on the reference sound input. For other implementations, the aforementioned ratio might instead be used to perform partial filtering proportional to the ratio determined. In yet other implementations, filtering might also only be applied (by any technique including the two previously described) when the acoustic transfer function of the reference sound input exceeds a predefined maximum threshold for "loud," when the acoustic transfer function sound signals exceeds a predefined minimum threshold for "soft," or both.

Figure 7:
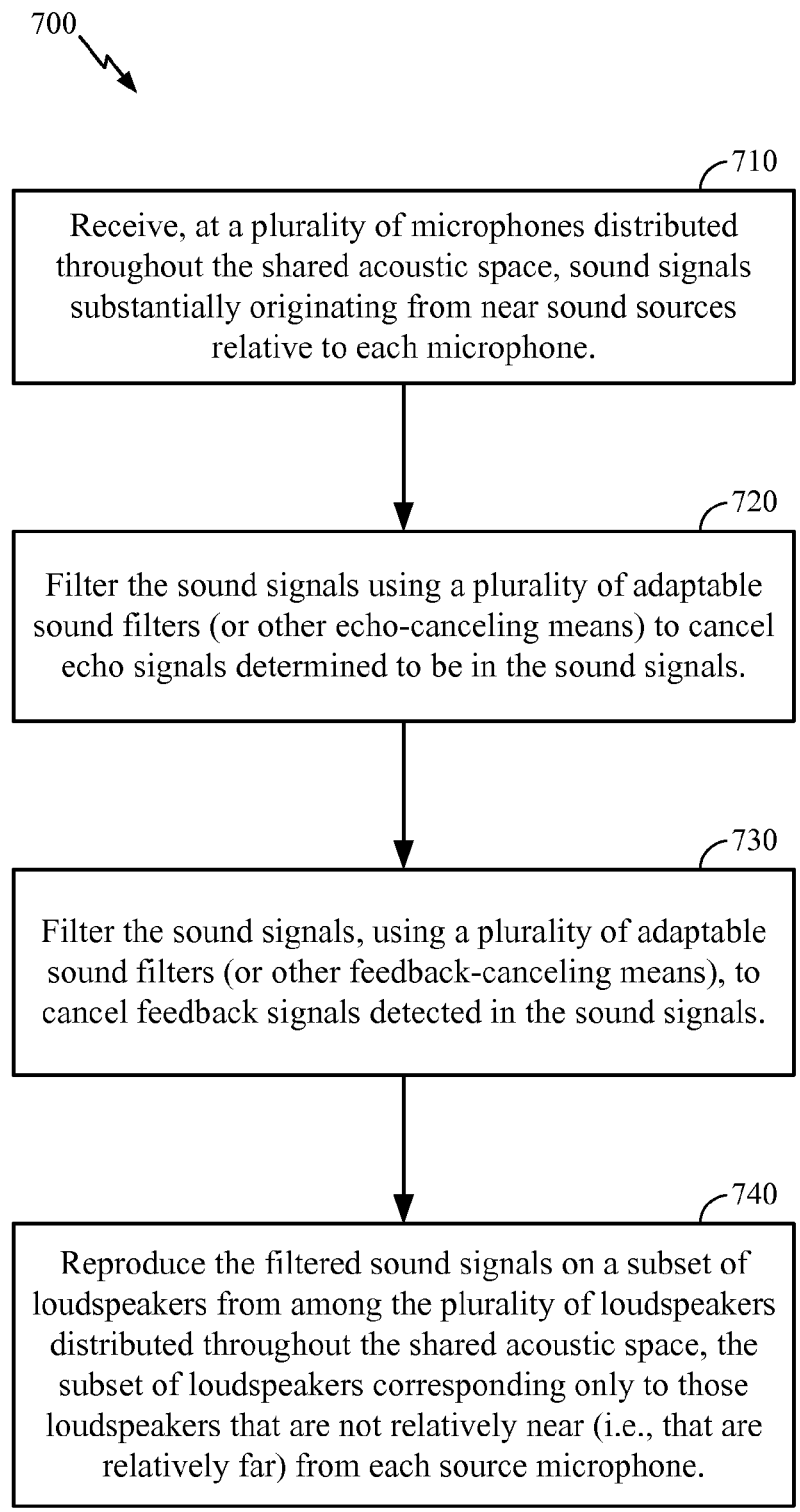
FIG. 7 is a process flow diagram for a method for enhancing conversational speech in a shared acoustic space—such as the shared acoustic space of the automobile illustrated in FIGS. 1 and 2—performed by a multichannel acoustic system comprising a plurality of microphones, a plurality of loudspeakers, and a plurality of echo canceling and feedback canceling filters, and representative of several implementations disclosed herein.

FIG. 7 is a process flow diagram 700 for a method for enhancing conversational speech in a shared acoustic space—such as the shared acoustic space 100 of the automobile 102 illustrated in FIGS. 1 and 2—by a multichannel acoustic system comprising a plurality of microphones, a plurality of loudspeakers, and a plurality of echo canceling and feedback canceling filters representative of several implementations disclosed herein. In FIG. 7, the method commences at 710 with receiving, at the plurality of microphones distributed throughout the shared acoustic space, sound signals substantially originating from near sound sources relative to each microphone. At 720, the sound signals are filtered, using a plurality of adaptable sound filters (or other echo-canceling means), to cancel echo signals determined to be in the sound signals. At 730, the sound signals are further filtered, using a plurality of adaptable sound filters (or other feedback-canceling means) to cancel feedback signals detected in the sound signals. At 740, the filtered sound signals are reproduced on a subset of loudspeakers from among the plurality of loudspeakers distributed throughout the shared acoustic space, the subset of loudspeakers corresponding only to those loudspeakers that are not relatively near (i.e., that are relative far) from each source microphone.

Thus, as illustrated in FIG. 7, enhancing conversational speech in a shared acoustic space of a vehicle—having a multichannel acoustic system operating within the shared acoustic space, the multichannel acoustic system comprising a plurality of microphones and a plurality of loudspeakers, the vehicle having a plurality of zones comprising at least a first zone and a second zone—may be achieved by various implementations disclosed herein by: receiving, at the plurality of microphones distributed throughout the shared acoustic space, sound signals substantially originating from a first zone sound source; echo filtering, at a plurality of adaptable sound filters, the sound signals to cancel at least one echo signal; feedback filtering, at the plurality of adaptable sound filters, the sound signals to cancel at least one feedback signal, the feedback filtering occurring before or after the echo filtering; and reproducing filtered sound signals on a subset of loudspeakers in the second zone. This enables a first passenger seated in a front row of the vehicle corresponding to a first zone to converse with a second passenger seated in a second zone corresponding to a row other than the first row, and vice versa. Canceling the at least one echo signal may be performed based on a predetermined echo cancelation calibration, and this may also include the predetermined echo cancelation calibration being one from among a plurality of predetermined echo cancelation calibrations wherein each of the predetermined echo cancelation calibration is performed based on different passenger configurations.

Furthermore, each filter from among the plurality of adaptable sound filters may also be configured to: receive, at each filter, sound signals intended for reproduction on at least one loudspeaker in the second zone and detected by at least one microphone in the first zone; receive, at each filter, evaluation signals from at least one microphone in the second zone, the evaluation signals corresponding to the received sound signals; determine, at the filter and based on the received evaluation signals, that the sound signals include a feedback signal; cancel the feedback signal; and send the filtered sound signals to at least one loudspeaker in the second zone. Moreover, each filter from among the plurality of adaptable sound filters may be coupled to at least one microphone in the first zone, at least one loudspeaker in the second zone, and at least one secondary microphone in the second zone, wherein each combination of microphone, loudspeaker, and secondary microphone is different for each filter from among the plurality of adaptable sound filters. Additionally, the plurality of microphones comprises a plurality of directional microphones, and the sound signals reproduced by each loudspeaker from among the plurality of loudspeakers are limited to a listener in a same zone as each such loudspeaker.

Figure 8:
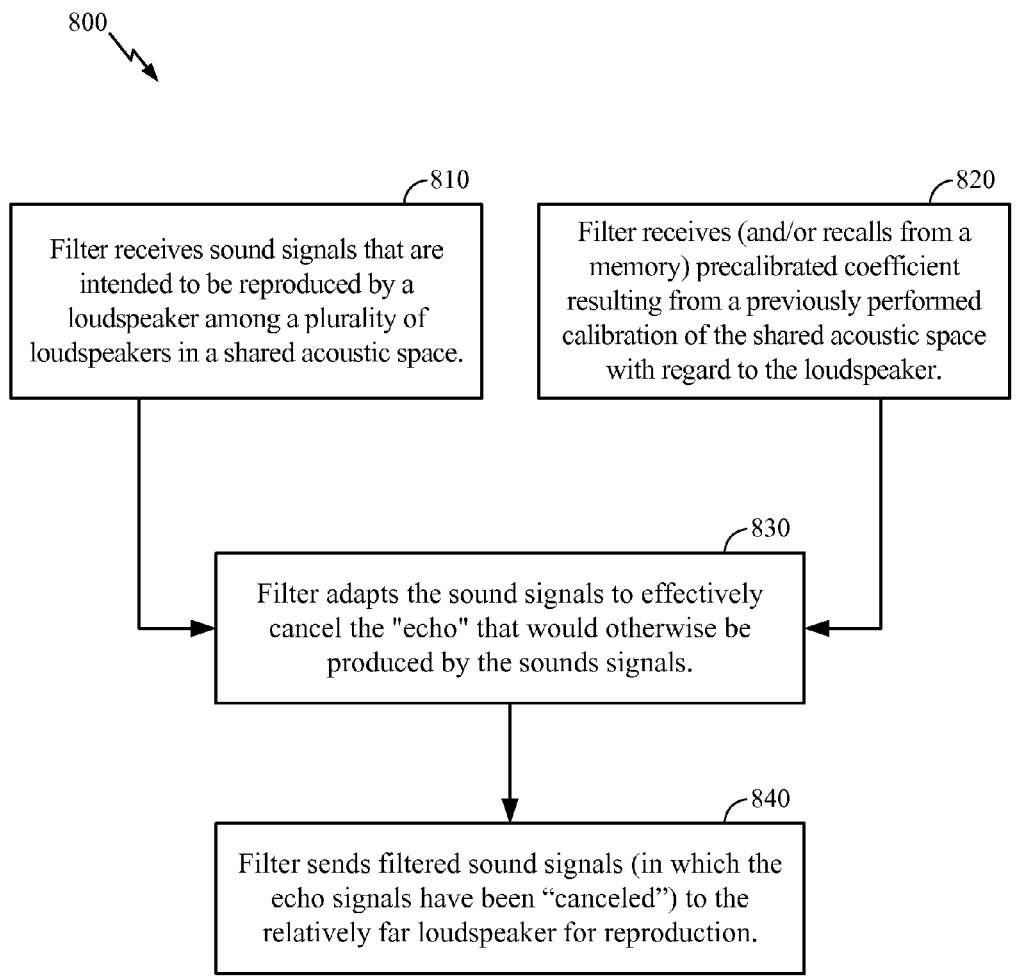
FIG. 8 is a process flow diagram, representative of implementations herein disclosed, for a method of filtering or canceling echo signals—at, for example, an adaptable sound filter—that would otherwise be produced by a plurality of loudspeakers in a shared acoustic space.

FIG. 8 is a process flow diagram 800, representative of implementations herein disclosed, for a method of filtering or canceling echo signals—at, for example, an adaptable sound filter—that would otherwise be produced by a plurality of loudspeakers in a shared acoustic space. In FIG. 8, at 810 the filter receives sound signals that are intended to be reproduced by a loudspeaker among a plurality of loudspeakers in a shared acoustic space. Separately, at 820—and generally well before the sound signals are received at 820—the same filter receives (and/or recalls from a memory) pre-calibrated coefficient resulting from a previously performed calibration of the shared acoustic space with regard to the loudspeaker. At 830, the filter adapts the sound signals to effectively cancel the echo that would otherwise be produced by the sound signals. At 840, the filtered sound signals (in which the echo signals have been canceled) are sent to the loudspeaker for reproduction.

Figure 9:
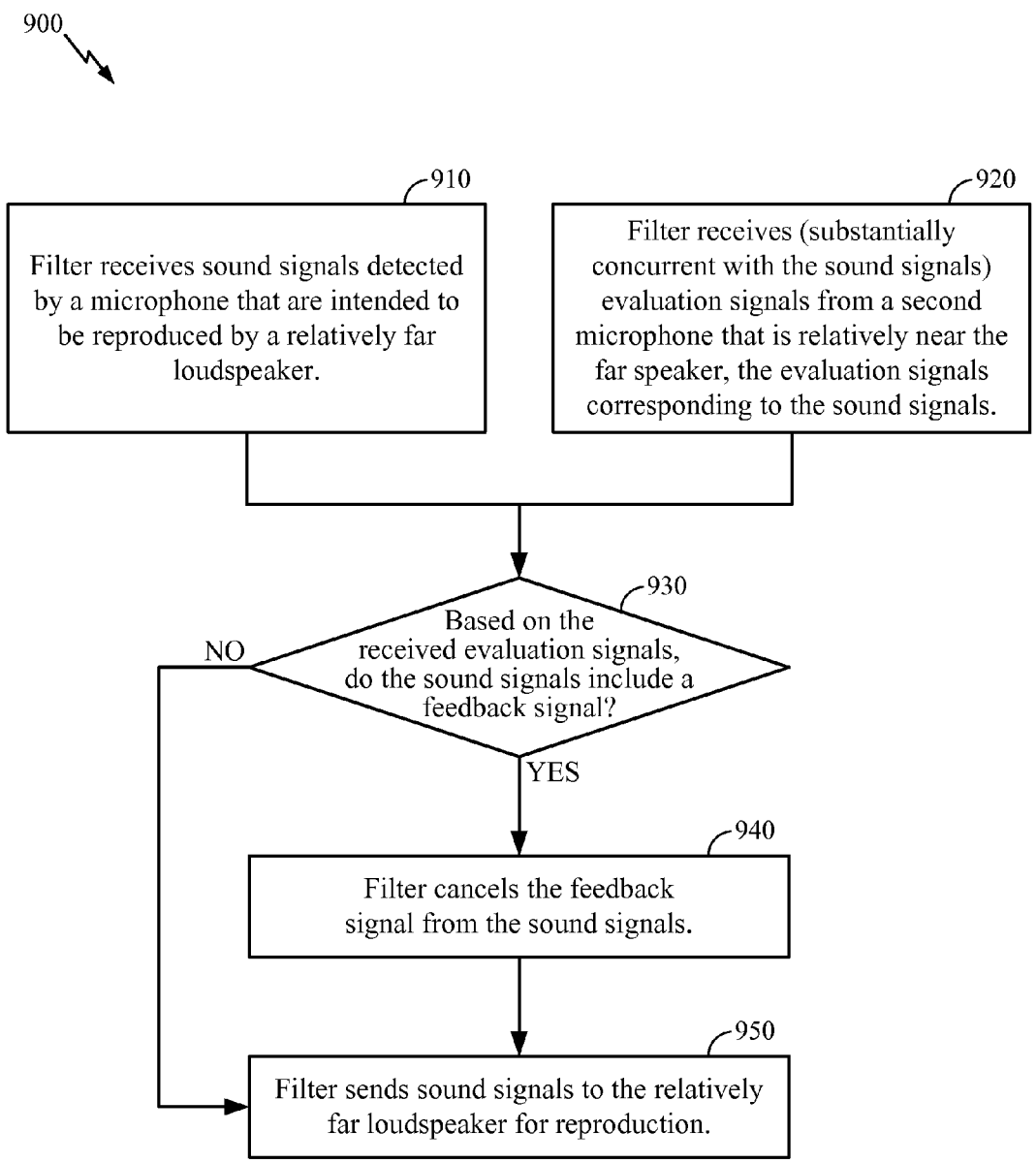
FIG. 9 is a process flow diagram, representative of implementations herein disclosed, for a method of filtering or canceling feedback signals—at, for example, an adaptable sound filter—from sound signals received from a microphone in a shared acoustic space that are to be reproduced by a far loudspeaker in the same shared acoustic space.

FIG. 9 is a process flow diagram 900, representative of implementations herein disclosed, for a method of filtering or canceling feedback signals—at, for example, an adaptable sound filter—from sound signals received from a microphone in a shared acoustic space that are to be reproduced by a far loudspeaker in the same shared acoustic space. In FIG. 9, at 910 the filter receives sound signals detected by a microphone that are intended to be reproduced by a relatively far loudspeaker. Separately, at 920 the same filter receives (substantially concurrent with the sound signals) evaluation signals from a second microphone that is relatively near the far speaker, the evaluation signals corresponding to the sound signals. At 930, the filter determines, based on the received evaluation signals, whether the sound signals include a feedback signal. If so, then at 940 the filter cancels the feedback signal from the sound signals and, at 950, the filtered sound signals are sent to the relatively far loudspeaker for reproduction. If not, then the sound signals are sent to the relatively far loudspeaker for reproduction as received by the filter (i.e., unfiltered).

With regard to FIGS. 7, 8, and 9, the term "filter" may be a single filter capable of performing both echo cancelation and feedback cancelation, and the capabilities of such a filter may include processing capabilities provided by the multichannel acoustic processor and/or other components.

In addition to the foregoing, certain implementations disclosed herein may make use of active or passive configuration determination techniques and/or active or passive identification determination techniques. These implementations may be configured to use any of several means for determining a current configuration of passengers in a shared acoustic space. For example, for certain implementations the MAS may determine a current configuration of passengers by monitoring sounds emanating from the specific seat locations of the vehicle to determine which seats are occupied and which seats are not. Image or video capture devices incorporated into the shared acoustic space might also be utilized to determine which seats are occupied and which seats are not. Likewise, other detection means—such as weight sensors integrated into the seat bottoms such as or akin to those already used in front passenger seats to detect whether to disable an airbag to protect a child passenger—can also be utilized. And a combination of these and other methods may be used to actively or passively determine which seats are occupied and which seats are not, and thereby enable the MAS to determine—on the basis of occupied seats—the current configuration of passengers and, based on this specific configuration, perform echo cancelation, feedback cancelation, and a variety of other functions pertaining to that particular configuration.

Likewise, with regard to active or passive identification determinations, the various implementations disclosed herein—and again discussed in the context of the automobile 102 of FIGS. 1 and 2 for convenience—may be configured to use any of several means for determining the specific identity of passengers in each occupied seat of a shared acoustic space. For example, for certain implementations the MAS may determine the specific identity of passengers by monitoring speech sounds emanating from each seat where the differences in speech from person to person is the basis for uniquely identifying each passenger. Image or video capture devices incorporated into the shared acoustic space and that utilize facial recognition software or some similar techniques might also be utilized to uniquely identify passengers in the occupied seats. Likewise, other detection features—such as weight sensors integrated into the seat bottoms such as or akin to those already used in front passenger seats to detect whether to disable an airbag to protect a child passenger—can also be utilized to distinguish between different passengers when the potential passengers are sufficiently small in number and diverse in measure to enable unique identification. And a combination of these and other methods may be used to actively or passively determine with greater accuracy the specific unique identity of the passenger in each occupied seat.

In this manner, not only does uniquely identifying each passenger also provide a broad determination of the configuration of the passengers on an occupied-seat basis (akin to the more general configuration determinations described above) but it also enables an additional level of specificity for personalized configuration determinations that, in addition to being based on which seats are occupied, is further refined based on which seats are occupied by specific known individuals. This, in turn, allows for distinctions for the specific four-person-based seating configuration reflected in FIGS. 1 and 2—which is one configuration among many possible based on which seats are occupied—with the additional dimension based on who is seating in each of those occupied seats. For the specific four-person-based seating configuration reflected in FIGS. 1 and 2, this additional dimension based on identity is essentially limitless (i.e., the entire human race of identities); however, since most personal vehicles often transport people from a much smaller subset of individuals, the actual number of additional configurations possible taking into account an identity dimension is certainly larger than configurations that do not account for passenger identity but is still relatively finite (and can be made even more finite by introducing filters such as only accounting for passengers that have occupied a seat for a minimum number of trips, or minimum number of trips within a specific window of time, etc.).

As used herein, references to "passive" determinations (of occupied-seat configurations and/or passenger identities) are those performed by the MAS through normal and typical operation of its functions without direct user input from passengers, whereas "active" determinations are those which also incorporate a user or passenger provide direct or intentional user input—such as speaking their own name, providing an access code, or indicating a preference or selecting a particular configuration, setting, etc. However, these distinctions are not intended to detract from or limit the inventive concepts disclosed herein, and thus any interpretation of "passive" as used herein includes "active" equivalents and vice versa.

Figure 10:
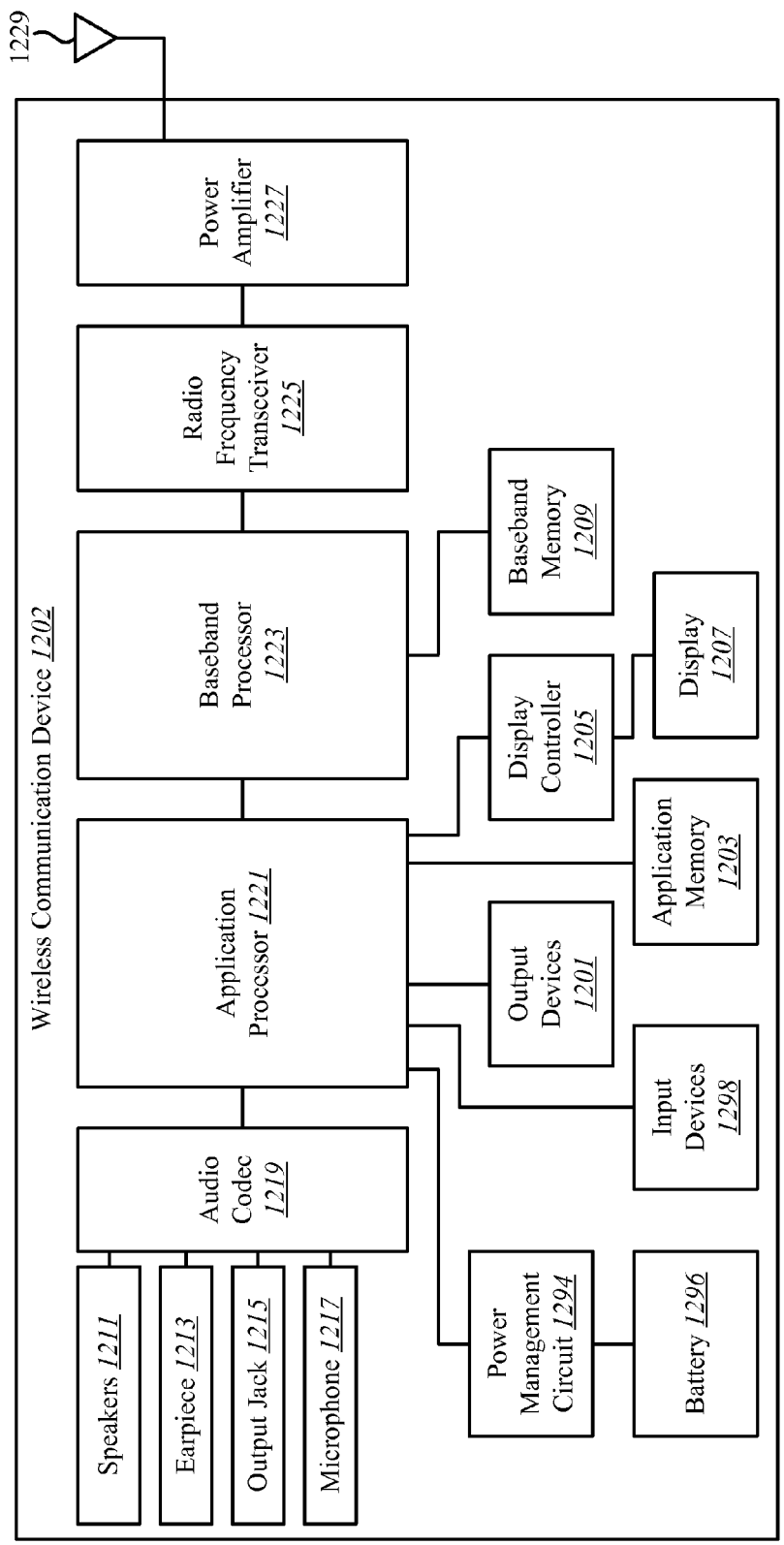
FIG. 10 is a block diagram illustrating one configuration of a wireless communication device in which aspects of various implementations herein disclosed may be implemented (at least in part)

FIG. 10 is a block diagram illustrating one configuration of a wireless communication device 1202 in which aspects of various implementations herein disclosed may be implemented (at least in part) in any of various locations such as, for example, in an automotive environment, a room, or any other shared acoustic space, and both alone or as an integrated part of such environments. The wireless communication device 1202 illustrated in FIG. 10 may be an example of one or more of the electronic devices described herein. The wireless communication device 1202 may include an application processor 1221. The application processor 1221 generally processes instructions (e.g., runs programs) to perform functions on the wireless communication device 1202. The application processor 1221 may be coupled to an audio coder/decoder (codec) 1219.

The audio codec 1219 may be used for coding and/or decoding audio signals. The audio codec 1219 may be coupled to at least one speaker 1211, an earpiece 1213, an output jack 1215 and/or at least one microphone 1217. The speakers 1211 may include one or more electro-acoustic transducers that convert electrical or electronic signals into acoustic signals. For example, the speakers 1211 may be used to play music or output a speakerphone conversation, etc. The earpiece 1213 may be another speaker or electro-acoustic transducer that can be used to output acoustic signals (e.g., speech signals) to a user. For example, the earpiece 1213 may be used such that only a user may reliably hear the acoustic signal. The output jack 1215 may be used for coupling other devices to the wireless communication device 1202 for outputting audio, such as headphones. The speakers 1211, earpiece 1213 and/or output jack 1215 may generally be used for outputting an audio signal from the audio codec 1219. The at least one microphone 1217 may be an acousto-electric transducer that converts an acoustic signal (such as a user's voice) into electrical or electronic signals that are provided to the audio codec 1219. In some configurations, the audio codec 1219 may perform one or more of the first stage processing and the second stage processing (and/or one or more of the other functions or procedures) described herein.

The application processor 1221 may also be coupled to a power management circuit 1294. One example of a power management circuit 1294 is a power management integrated circuit (PMIC), which may be used to manage the electrical power consumption of the wireless communication device 1202. The power management circuit 1294 may be coupled to a battery 1296. The battery 1296 may generally provide electrical power to the wireless communication device 1202. For example, the battery 1296 and/or the power management circuit 1294 may be coupled to at least one of the elements included in the wireless communication device 1202.

The application processor 1221 may be coupled to at least one input device 1298 for receiving input. Examples of input devices 1298 include infrared sensors, image sensors, accelerometers, touch sensors, keypads, etc. The input devices 1298 may allow user interaction with the wireless communication device 1202. The application processor 1221 may also be coupled to one or more output devices 1201. Examples of output devices 1201 include printers, projectors, screens, haptic devices, etc. The output devices 1201 may allow the wireless communication device 1202 to produce output that may be experienced by a user.

The application processor 1221 may be coupled to application memory 1203. The application memory 1203 may be any electronic device that is capable of storing electronic information. Examples of application memory 1203 include double data rate synchronous dynamic random access memory (3RAM), synchronous dynamic random access memory (SDRAM), flash memory, etc. The application memory 1203 may provide storage for the application processor 1221. For instance, the application memory 1203 may store data and/or instructions for the functioning of programs that are run on the application processor 1221.

The application processor 1221 may be coupled to a display controller 1205, which in turn may be coupled to a display 1207. The display controller 1205 may be a hardware block that is used to generate images on the display 1207. For example, the display controller 1205 may translate instructions and/or data from the application processor 1221 into images that can be presented on the display 1207. Examples of the display 1207 include liquid crystal display (LCD) panels, light emitting diode (LED) panels, cathode ray tube (CRT) displays, plasma displays, etc.

The application processor 1221 may be coupled to a baseband processor 1223. The baseband processor 1223 generally processes communication signals. For example, the baseband processor 1223 may demodulate and/or decode received signals. Additionally or alternatively, the baseband processor 1223 may encode and/or modulate signals in preparation for transmission.

The baseband processor 1223 may be coupled to baseband memory 1209. The baseband memory 1209 may be any electronic device capable of storing electronic information, such as SDRAM, 3RAM, flash memory, etc. The baseband processor 1223 may read information (e.g., instructions and/or data) from and/or write information to the baseband memory 1209. Additionally or alternatively, the baseband processor 1223 may use instructions and/or data stored in the baseband memory 1209 to perform communication operations.

The baseband processor 1223 may be coupled to a radio frequency (RF) transceiver 1225. The RF transceiver 1225 may be coupled to a power amplifier 1227 and one or more antennas 1229. The RF transceiver 1225 may transmit and/or receive radio frequency signals. For example, the RF transceiver 1225 may transmit an RF signal using a power amplifier 1227 and at least one antenna 1229. The RF transceiver 1225 may also receive RF signals using the one or more antennas 1229.

Figure 11:
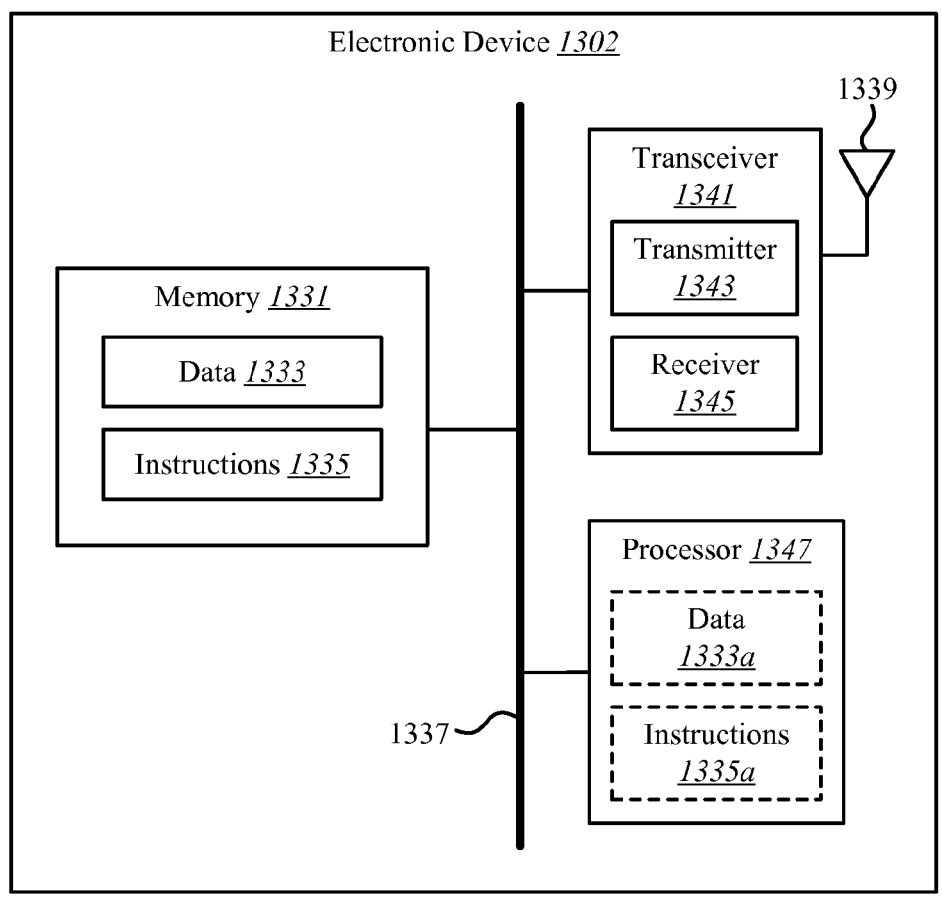
FIG. 11 illustrates certain components that may be included within an electronic device for implementing various implementations disclosed herein (at least in part).

FIG. 11 illustrates certain components that may be included within an electronic device 1302 for implementing various implementations disclosed herein (at least in part). The electronic device 1302 described in connection with FIG. 11 may be an example of and/or may be implemented in accordance with one or more of the electronic devices described herein.

The electronic device 1302 includes a processor 1347. The processor 1347 may be a general purpose single- or multi-chip microprocessor (e.g., an ARM), a special purpose microprocessor (e.g., a digital signal processor (DSP)), a microcontroller, a programmable gate array, etc. The processor 1347 may be referred to as a central processing unit (CPU). Although just a single processor 1347 is shown in the electronic device 1302 of FIG. 11, in an alternative configuration, a combination of processors (e.g., an ARM and DSP) could be used.

The electronic device 1302 also includes memory 1331 in electronic communication with the processor 1347 (i.e., the processor 1347 can read information from and/or write information to the memory 1331). The memory 1331 may be any electronic component capable of storing electronic information. The memory 1331 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1333 and instructions 1335 may be stored in the memory 1331. The instructions 1335 may include one or more programs, routines, sub-routines, functions, procedures, code, etc. The instructions 1335 may include a single computer-readable statement or many computer-readable statements. The instructions 1335 may be executable by the processor 1347 to implement one or more of the methods described above. Executing the instructions 1335 may involve the use of the data 1333 that is stored in the memory 1331. FIG. 11 shows some instructions 1335a and data 1333a being loaded into the processor 1347.

The electronic device 1302 may also include a transmitter 1343 and a receiver 1345 to allow transmission and reception of signals between the electronic device 1302 and a remote location (e.g., a base station). The transmitter 1343 and receiver 1345 may be collectively referred to as a transceiver 1341. An antenna 1339 may be electrically coupled to the transceiver 1341. The electronic device 1302 may also include (not shown) multiple transmitters, multiple receivers, multiple transceivers and/or multiple antenna.

The various components of the electronic device 1302 may be coupled together by one or more buses, which may include a power bus, a control signal bus, a status signal bus, a data bus, etc. For simplicity, the various buses are illustrated in FIG. 11 as a bus system 1337.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. Moreover, the phrase "based on" does not mean "based only on," unless expressly specified otherwise. In other words, the phrase "based on" describes both "based only on" and "based at least on."

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular figure. Furthermore, those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of the implementations of the methods described with respect to the various Figures, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed—at least in part—by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Stated differently, it is to be understood that the claims are not limited to the precise configuration and components illustrated above, and the various modifications, changes and variations may be made in the arrangement, operation and details of the systems, methods, and apparatus described herein without departing from the scope of the claims.

Furthermore, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

What is claimed is:

1. A method for enhancing conversational speech in a shared acoustic space, the method comprising:
   receiving, at a microphone positioned in a first zone of the shared acoustic space, a sound signal substantially originating from a sound source in a second zone of the shared acoustic space;
   receiving, at an adaptive filter from the microphone, audio data representative of the sound signal and affected by distortion attributable to feedback;
   receiving, at the adaptive filter from a second microphone positioned in the second zone, reference audio data representative of the sound signal;
   filtering, by the adaptive filter, the audio data based on the reference audio data to generate filtered audio data having reduced distortion; and
   sending the filtered audio data to an output device located in the second zone.

2. The method of claim 1, wherein the filtered audio data has reduced distortion as compared to the sound signal represented by the audio data, and further comprising:
   prior to receipt of the audio data at the adaptive filter, determining a plurality of echo effects, each echo effect attributable to a different layout of one or more objects within the shared acoustic space;
   determining a plurality of echo cancelation coefficients by determining a corresponding echo cancelation coefficient for each echo effect;
   storing the plurality of echo cancelation coefficients in a memory; and
   after receipt of the audio data, applying, at the adaptive filter, an echo cancelation coefficient selected from the plurality of echo cancelation coefficients to the audio data.

3. The method of claim 2, wherein the one or more objects comprise one or more occupants of the shared acoustic space, further comprising determining an identity of each occupant, and wherein determining the identity of each occupant comprises measuring a weight of each occupant using a weight sensor.

4. The method of claim 2, wherein the shared acoustic space comprises a vehicle, and wherein determining the plurality of echo cancelation coefficients comprises:
   producing a test sound at the output device; and
   determining an acoustic path of the test sound relative to a target listening location of the shared acoustic space.

5. The method of claim 1, further comprising:
   receiving, at the second microphone of the shared acoustic space, a second sound signal substantially originating from a second sound source in the first zone;
   receiving, at a second adaptive filter from the second microphone, second audio data representative of the second sound signal and affected by second distortion attributable to second feedback;
   receiving, at the second adaptive filter from the microphone, second reference audio data representative of the second sound signal;
   filtering, by the second adaptive filter, the second audio data based on the second reference audio data to generate second filtered audio data having reduced second distortion; and
   sending the second filtered audio data to a second output device located in the first zone.

6. The method of claim 5, further comprising producing a second output sound at the second output device based on the second filtered audio data, wherein the second output sound is substantially free of the second distortion.

7. The method of claim 1, further comprising producing an output sound at the output device based on the filtered audio data, wherein the output sound is substantially free of the distortion.

8. A multichannel acoustic system for enhancing conversational speech in a shared acoustic space, the multichannel acoustic system comprising:
   a microphone positioned in a first zone of the shared acoustic space, the microphone configured to receive a sound signal substantially originating from a sound source in a second zone of the shared acoustic space;
   a second microphone positioned in the second zone, the second microphone configured to receive reference audio data representative of the sound signal;
   an adaptive filter configured to:
      receive audio data from the microphone, the audio data representative of the sound signal and affected by distortion attributable to feedback;
      receive from a second microphone positioned in the second zone, reference audio data representative of the sound signal; and
      filter the audio data based on the reference audio data to generate filtered audio data having reduced distortion; and
   an output device located in the second zone, the output device configured to receive the filtered audio data.

9. The multichannel acoustic system of claim 8, wherein the multichannel acoustic system further comprises a processor configured to:
   prior to receipt of the audio data at the adaptive filter, determine a plurality of echo effects, each echo effect attributable to a different layout of one or more objects within the shared acoustic space; and determine a plurality of echo cancelation coefficients, by determining a corresponding echo cancelation coefficient for each echo effect.

10. The multichannel acoustic system of claim 9, further comprising:
a memory configured to store the plurality of echo cancelation coefficients; and
a processor configured to select an echo cancelation coefficient from among the plurality of echo cancelation coefficients, wherein the echo cancelation coefficient is selected based on the different layout.

11. The multichannel acoustic system of claim 10, wherein the adaptive filter is further configured to apply the echo cancelation coefficient to the audio data to cancel an echo effect associated with the audio data.

12. The multichannel acoustic system of claim 9, further comprising:
a second adaptive filter configured to:
receive second reference audio data from the microphone, the second reference audio data representative of a second sound signal substantially originating from a second sound source in the first zone;
receive second audio data from the second microphone, the second audio data representative of the second sound signal and affected by second distortion attributable to second feedback; and
filter the second audio data based on the second reference audio data to generate second filtered audio data having reduced second distortion; and
a second output device located in the first zone, the second output device configured to receive the second filtered audio data.

13. The multichannel acoustic system of claim 8, further comprising a third microphone and a third output device located in a third zone of the shared acoustic space.

14. The multichannel acoustic system of claim 8, wherein the microphone and the second microphone comprise directional microphones.

15. An apparatus for enhancing conversational speech in a shared acoustic space, the apparatus comprising:
means for receiving a sound signal substantially originating from a sound source in a second zone of the shared acoustic space, wherein the means for receiving is positioned in a first zone of the shared acoustic space and is configured to generate audio data, the audio data representative of the sound signal and affected by distortion attributable to feedback;
means for generating reference audio data representative of the sound signal, the means for generating reference audio data associated with the second zone;
means for filtering the audio data based on the reference audio data to generate filtered audio data having reduced distortion; and
means for producing sound, wherein the means for producing sound is located in the second zone, and wherein the means for producing sound is configured to receive the filtered audio data.

16. The apparatus of claim 15, wherein the means for receiving, the means for generating reference audio data, the means for filtering, and the means for producing sound are incorporated into a vehicle.

17. The apparatus of claim 15, wherein the means for receiving, the means for generating reference audio data, the means for filtering, and the means for producing sound are incorporated into a room.

18. The apparatus of claim 15, further comprising means for processing configured to:
prior to receipt of the audio data at the means for filtering, determine a plurality of echo effects, each echo effect attributable to a different layout of one or more objects within the shared acoustic space; and
determine a plurality of echo cancelation coefficients, by determining a corresponding echo cancelation coefficient for each echo effect.

19. The apparatus of claim 18, further comprising means for storing the plurality of echo cancelation coefficients.

20. The apparatus of claim 19, wherein the means for processing is further configured to select an echo cancelation coefficient from among the plurality of echo cancelation coefficients and to provide the echo cancelation coefficient to the means for filtering.

21. The apparatus of claim 19, wherein the means for receiving, the means for generating reference audio data, the means for filtering, the means for producing sound, the means for processing, and the means for storing are incorporated into a vehicle.

22. A computer-readable medium storing computer-executable instructions for enhancing conversational speech in a shared acoustic space, the computer-executable instructions comprising instructions for:
receiving, at a microphone positioned in a first zone of the shared acoustic space, a sound signal substantially originating from a sound source in a second zone of the shared acoustic space;
receiving, at an adaptive filter from the microphone, audio data affected by distortion attributable to feedback;
receiving, at the adaptive filter from a second microphone positioned in the second zone, reference audio data representative of the sound signal;
filtering, by the adaptive filter, the audio data based on the reference audio data to generate filtered audio data having reduced distortion; and
sending the filtered audio data to an output device located in the second zone.

23. The computer-readable medium of claim 22, wherein the computer-executable instructions further comprise instructions for:
determining first data corresponding to a first acoustic transfer function that corresponds to the sound signal;
determining second data corresponding to a second acoustic transfer function that corresponds to the reference audio data;
determining a third value corresponding to a ratio of the first acoustic transfer function and the second acoustic transfer function; and
comparing the third value to a threshold value.

24. The computer-readable medium of claim 23, wherein filtering the audio data comprises filtering distortive elements embedded within the audio data in a quantity proportional to the third value in response to the third value exceeding the threshold value.

25. The computer-readable medium of claim 23, wherein filtering the audio data is performed in response to determining that the third value exceeds the threshold value.

26. The computer-readable medium of claim 22, further comprising:
determining a particular positioning of objects within the shared acoustic space; and
after determining the particular positioning of the objects, selecting an echo cancelation coefficient from among a plurality of echo cancelation coefficients based on the particular positioning of the objects.

27. The computer-readable medium of claim 26, further comprising applying the echo cancelation coefficient to cancel an echo effect associated with the particular positioning of the objects.

28. The computer-readable medium of claim 22, wherein the sound source corresponds to an occupant located in the second zone, wherein the sound signal is associated with the occupant talking, and wherein the filtered audio data corresponds to a voice of the occupant substantially undistorted by the feedback.

* * * * *